Patented Mar. 23, 1926.

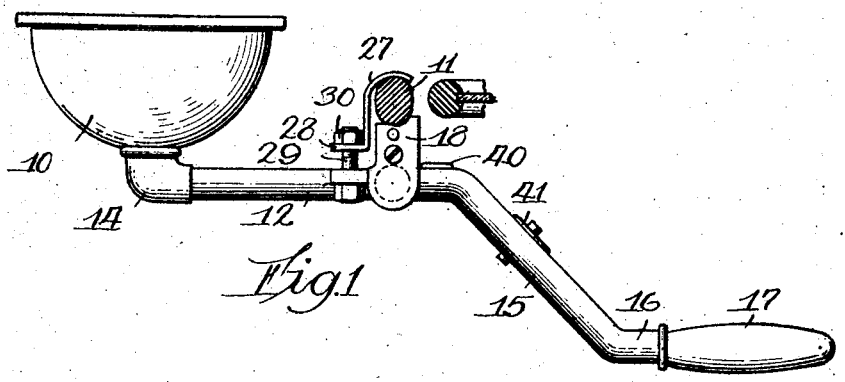

1,578,025

UNITED STATES PATENT OFFICE.

BERTRAM J. GRIGSBY, OF PARK RIDGE, ILLINOIS, ASSIGNOR, BY MESNE ASSIGNMENTS, TO APPLETON ELECTRIC CO., OF CHICAGO, ILLINOIS, A CORPORATION OF ILLINOIS.

INSIDE CONTROLLED VEHICLE SEARCHLIGHT.

Application filed May 17, 1921. Serial No. 470,251.

*To all whom it may concern:*

Be it known that I, BERTRAM J. GRIGSBY, a citizen of the United States, and a resident of Park Ridge, in the county of Cook and State of Illinois, have invented certain new and useful Improvements in Inside Controlled Vehicle Searchlights; and I do hereby declare that the following is a full, clear, and exact description thereof, reference being had to the accompanying drawings, and to the characters of reference marked thereon, which form a part of this specification.

This invention relates to improvements in spot or signal lamp mountings adapted for use on vehicles, such as automobiles, and constructed with mounting means whereby the lamp casing may be directed through wide ranges of horizontal and vertical movements to give a so-called universal movement to the lamp casing and the reflected rays of light projected from the lamp therein.

The invention relates more particularly to a type of universally directed spot or signal lamp mounting which is designed to be operated from the interior of a car in such a way that the lamp may be adjusted in its various movements without exposing the hand of the driver outside the car. The construction embodying the present invention is adaptable for use in connection with closed body cars, and also with cars having foldable tops and side curtains, so that in the first installation the lamp can be directed from the interior of the car without opening the door of the closed body, and in the other installation the lamp can be directed from the interior of the car when the side curtains are in place.

The object of the invention is to provide a very simple, economical, and efficient signal or spot lamp mounting for the purpose described and a structure which avoids the use of power transmitting gears and multiple shafts to effect the required vertical and horizontal adjustments of the lamp casing.

A further object of the invention is to provide an improved universal signal or spot lamp mounting, the parts of which can be constructed of simple and readily made and assembled elements, and to provide a mounting in which large freedom of movement of the parts can be attained to effect desired adjustments of the lamp and also to hold the lamp in place when adjusted.

In the drawings:

Figure 1 is a plan view of a spot or signal lamp and its mounting embodying my invention.

Figure 2 is a rear view thereof.

Figure 3 is an enlarged detail section on the line 3—3 of Figure 2.

Figure 4 is a detail of a modified mounting, designed more especially for a closed car.

Figure 5 is a section on the line 5—5 of Figure 4.

First, referring to the construction shown in Figures 1, 2, and 3, designed more especially for open cars having foldable tops and removable side curtains, 10 designates a lamp casing of usual construction, and 11 designates a fixed support on the vehicle, as one of the posts on the wind shield frame.

12 designates a tubular rock shaft, to the outer end of which is connected in any suitable manner the lamp casing 10, the connection being herein shown as an elbow fitting 14. Said rock shaft is preferably tubular so that the lamp conductors may be carried therethrough to the lamp and also, if desired, to a switch supported on or in the rock shaft.

Said rock shaft can be mounted on the post or other fixed support 11 by any suitable form of bracket, hereinafter to be more fully described. It may be stated at this point that the bracket structure for connecting the rock shaft to the fixed support embodies a suitable bearing in which the rock shaft is mounted to turn on its axis, herein shown as in a horizontal plane, and said bearing is mounted to rotate about an axis disposed at a right angle thereto, or in a vertical plane.

The rock shaft 12 extends inwardly beyond said bracket and rotative mounting to form an oblique crank portion 15 within the car, usually between the position of the steering wheel and the wind shield, and said crank portion terminates in a straight portion 16, having a hand piece 17. The said crank enables the rock shaft to be given both a rocking movement about the axis of the member 12 and a swinging movement about the axis of the bearing in which said member 12 is mounted to rock.

Referring now more particularly to the details of a preferred embodiment of the invention said bearing mounting and bracket, the same are made as follows:

18, 18 designate upper and lower plates which are arranged in rear of the fixed support 11 and are formed at their forward ends with recesses 19, 19 adapted to engage the rear side of said post or fixed support 11. 20, 20 designate the two members of a transversely divided bearing which enter at their upper and lower ends inwardly facing bearing recesses 21, 21 formed in said plates adjacent to the rear ends thereof. The said members 20 are divided or spaced in a plane at right angles to the axis of rotation thereof. They are formed at their proximate ends with part-cylindrical bearings 22, 22 to receive and support the tubular rock shaft 12. The said plates 18 are pressed upon the bearing members 20 by two clamping screws 23, 23, each of which extends loosely through an opening in one plate and an aligned threaded socket 24 in the other plate, as most clearly shown in Figure 3, the threaded ends of said screws engaging opposite plates.

In order that the clamping or confining pressure of the plates against the bearing members 20 may be a yieldable or controllable pressure, springs 25, 25 are interposed between the upper and lower ends of said bearing members and the end walls of the recesses 21. With the construction shown, it will be observed that the clamping screws 23 serve not only to yieldingly press the bearing members 20 on the rock shaft 22 to hold said shaft from rocking after it has been adjusted to swing the lamp in a vertical plane, but also serve to yieldingly permit the bearing members 20 to be rocked on their axes and to be held in adjusted positions.

The means for fixing the mounting thus described to the post 11 comprises a bracket structure which embraces lugs 26, 26, which are made integral with and extend laterally from the rear ends of the plates 18, and a hook member 27 which engages over the side of the post 11 remote from the engagement thereof with the recessed ends of the plates, said hook member being provided at its rear end with a broad, laterally extending perforated ear 28, through which and the perforated lugs 26 headed clamping bolts 29 are adapted to pass, the parts being clamped by nuts 30 threaded to said bolts. The construction described affords means for fixedly attaching the lamp mounting to the wind shield post or other fixed support and to hold it against torsional or twisting movement thereon, in the rocking and swinging movements of the universal mounting.

In operation, it will be observed that the lamp casing may be swung vertically about the axis of the rock shaft 12 by grasping the hand piece 17 of the operating crank and moving it upwardly and downwardly, the said rock shaft at the time rocking on its axis in the bearing recesses of the blocks or members 20. Said lamp casing may be swung in a horizontal plane by merely pushing said hand piece 17 forwardly or pulling it rearwardly, and the mounting at this time will rotate about the axes of the bearing members 20. The springs 25 between the ends of said bearing blocks or members and the ends of their recesses serve to transmit yielding clamping pressure of said bearing members or blocks, and the tension thereof can be regulated by the screws 23 so as to permit the tubular shaft to be rocked in its bearing with moderate manual power while holding the rock shaft in a desired position of adjustment. The said springs 25 also have the effect to impose a braking action on the rotational movement of said bearing members that allows ready adjustment of the lamp in a horizontal plane, while locking the parts in a desired horizontal adjustment. It is to be understood that the particular spring detail may be varied to adapt itself to variations in the bearing blocks and to the mounting for the bearing blocks.

In order to avoid axial displacement of the rock shaft 12, the portion thereof which directly engages the bearing formed between the two members or blocks 20 is slightly reduced to form on both sides of said bearing blocks limiting shoulders, as indicated by the dotted lines in Figure 3.

The detail of the construction shown in Figures 4 and 5 is designed to adapt the universal mounting of the signal or spot lamp to a closed car. In said construction 31 designates a mounting plate which can be fastened to any suitable part of the closed car frame, as in front of the door frame. The particular configuration of said plate, therefore, will depend upon the formation of the body part to which the plate is directly attached. Said plate is shown as adapted to be attached to the outer side face of a car body just in rear of the angle between the side of the body and the front panel. It is provided with screw holes 32 to receive attaching screws that are threaded into the car body, or said holes may be adapted to receive fastening bolts. The plate is centrally provided with an opening 33 through which the rock shaft 34 extends. Axially in line with said opening, and integral with said plate, is an inwardly extending, externally threaded lug or flange 35 which is formed on its inner face with a segmental spherical recess to partially receive a two part bearing ball designated as a whole by 36. Said ball is divided in a horizontal plane that cuts or bisects the axis of the ball. The shaft 34 extends through said two part bearing ball and is reduced at 37 within the ball to provide at the ends of the reduced portion limiting shoulders which avoid axial shifting of said rock shaft. 38 designates an internally threaded nut that engages over and is threaded to the lug 35. Said nut is also provided with a segmental cylindric recess 39 which opposes the like shaped recesses of the ball 36 and which is adapted to bear on the two part ball in a direction opposed to the bottoms of said recess of the lug 35 and in a manner to force the members of the two part ball on the rock shaft 34 with a clamping action and thereby exert frictional contact between the central bearing of said two part ball and the rock shaft 34. The said nut also, in the same way, serves to clamp the two part ball between the segmental spherical surfaces of the parts 35 and 39 to exert friction between said surfaces and the periphery of the ball, and thus prevent the ball turning with respect to said bearing surfaces.

The opening 33 through which the rock shaft 34 extends is elongated in a horizontal direction so as to give ample range of movement for the rock shaft 34 when it is swung in a horizontal plane to give horizontal sweep to the spot or signal lamp casing. Vertical sweep of the lamp casing will be afforded by rocking the shaft 34 on its axis in the same way as in the construction described in connection with Figures 1, 2, and 3.

When the rock shaft is tubular to receive and support the lamp conductors, the said shaft may be provided just inside of its supporting and mounting bearing with an outlet nipple 40, through which the conductors can be threaded into the tubular shaft. Any suitable form of switch 41 may also be carried by the shaft, as the crank portion herein shown, to be connected with a loop of the conductor extending from the outlet 40.

I claim as my invention:

1. An inside control vehicle spot lamp mounting comprising a continuous, rigid member formed at one end to provide a rigid crank and at its other end to rigidly connect it to a lamp casing mount, and formed between its ends as a rock shaft, and a rocking bearing member to receive and rockably support said rock shaft, the rocking axes of said shaft and bearing member intersecting within the body of said member, and cooperating shoulders between the rock shaft and said bearing member to hold the rock shaft against endwise movement.

2. An inside control vehicle spot lamp mounting, embracing a continuous rigid member formed at its inner end to provide a fixed crank and at its other end to provide a rock shaft adapted at its other end to fixedly support a lamp casing mount, and a bearing mounting for the rock shaft having means of support on a vehicle, and embracing a member rotative in said mounting in one plane and provided with a bearing for the rock shaft in which said shaft rocks about an axis in another plane, with said axes intersecting within said bearing.

3. An inside control vehicle spot lamp mounting comprising a bracket having means of support to a fixed part of a vehicle, a one piece member formed at one end to provide a rock shaft, with fixed means of attaching a lamp casing thereto, and formed at its other end to provide a fixed crank arm adapted to extend into the vehicle, and a two-part mounting bearing supported to turn in said bracket, in which said rock shaft is mounted to turn on its axis, the two parts of said bearing being parted in a plane in which the turning axis of the rock shaft lies.

4. A spot lamp control mounting comprising, in combination with a rockable shaft for supporting a lamp and a two-part bearing in which said shaft turns and divided in a plane in which the turning axis of said shaft lies, of supporting means to carry said bearing and in which it turns, and means operative yieldingly to hold in bearing relation to said shaft both said bearings.

5. An inside control vehicle spotlamp mounting comprising a continuous rigid member formed at its inner end into a crank and at its other end to support a lamp casing mount, and a bearing mounting engaged with an intermediate portion of said member having means of support on a vehicle, said bearing mounting embracing a member rotative in a single plane and provided with a bearing for said continuous member permitting the latter to rotate about an axis in said plane, and there being interlocking shoulders between said members to hold said continuous member against lengthwise movement through said bearing mounting.

6. An inside control vehicle spot lamp mounting comprising a bracket having means of support to a fixed part of the vehicle, a one piece supporting and actuating member for a lamp and having a normally horizontal bearing portion, and provided at one end with means to attach a lamp casing thereto, and provided at its other end with a crank arm adapted to extend into a vehicle, and a mounting bearing supported by said bracket, including a two-part bearing member through which said supporting and bearing member extends and in which it rocks on its axis, and including also means whereby said bearing member can rotate on an axis at an angle to the axis of rotation of the rock shaft, and adjustable tension means for presenting both the bearing surfaces of the mounting bearing towards each other and on said supporting and bearing member.

7. An inside control vehicle spot lamp mounting comprising a bracket having means of support to a fixed part of a vehicle, a one piece member formed at one end to provide a rock shaft, with means for fixedly attaching a lamp casing to one end thereof and formed at its other end to provide a fixed crank arm adapted to extend into the vehicle, and a mounting bearing supported by said bracket, embracing a split member formed to provide a frictional bearing for the rock shaft, and the bracket embracing seats in which said mounting bearing is rotatably and yieldably mounted to turn on an axis at a right angle to the turning axis of said rock shaft.

8. An inside control vehicle spot lamp mounting comprising a bracket having means of support to a fixed part of the vehicle, a one piece member formed at one end to provide a rock shaft, with means for attaching a lamp casing thereto, and formed at its other end to provide a crank arm adapted to extend into the vehicle, a mounting bearing supported by said bracket, embracing a split member formed to provide a bearing for the rock shaft, and the bracket embracing seats in which said mounting bearing is rotatably mounted, and means for varying the pressure of the bearing members on each other.

9. An inside control vehicle spot lamp mounting comprising a continuous, nonflexible, unitary member formed with a central bearing portion, at one end with a crank to extend into a car body, and at its other end with means to carry a spot lamp, a supporting and bearing member formed with a bearing in which said shaft rocks, and means adapting said bearing to rock on an axis at a right angle to that of said shaft, said rocking axes intersecting within the body of said bearing member.

10. An inside control vehicle spot lamp mounting comprising a continuous, nonflexible, unitary member formed with a central bearing portion, at one end with a crank to extend into a car body, and at its other end with means to carry a spot lamp, a supporting and bearing member formed with a bearing in which said shaft rocks, means adapting said bearing to rock on an axis at a right angle to that of said shaft, said rocking axes intersecting within the body of said bearing member, and means common to both bearings for varying bearing engagement thereof.

11. An inside control vehicle spot lamp mounting comprising a bracket having means of support to a fixed part of a vehicle, a one piece member formed at one end to provide a rock shaft with means for attaching a lamp casing thereto, and formed at its other end into a crank arm adapted to extend into the vehicle, a bearing member engaged with said rock shaft and permitting the latter to rotate about its long axis, and means on said bracket for supporting said bearing member to permit it to swing only in a plane containing said axis.

In witness whereof I claim the foregoing as my invention, I hereunto append my signature this 14 day of May, 1921.

BERTRAM J. GRIGSBY.